3,510,496
BENZENESULFONYL-UREAS WITH
HYPOGLYCEMIC ACTIVITY

Walter Aumuller, Kelkheim, Taunus, Helmut Weber and Rudi Weyer, Frankfurt am Main, and Karl Muth, Kelkheim, Taunus, Germany; and Wilhelm Ludwig Andreas Richard Peschke, deceased, late of Mannheim, Germany, by Christel Elisabeth Peschke, née Dryzysga, coheiress, and Bruno Rotzinger, curator, both of Mannheim, Germany, assignors to Farbwerke Hoechst Aktiengesellschaft vormals Meister Lucius & Bruning, Frankfurt am Main, Germany, a corporation of Germany
No Drawing. Continuation-in-part of application Ser. No. 471,449, July 12, 1965. This application June 3, 1968, Ser. No. 738,729
Claims priority, application Germany, July 30, 1964, F 43,614; Luxembourg, Jan. 13, 1965, 47,776
Int. Cl. C07d 27/56; A61k 27/00
U.S. Cl. 260—325                        16 Claims

ABSTRACT OF THE DISCLOSURE

Benzenesulfonyl-ureas with hypoglycemic activity having the general formula

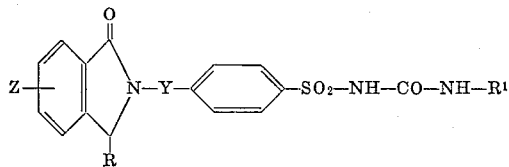

in which:

R is hydrogen or lower alkyl,
Z is hydrogen or halogen,
Y is a saturated hydrocarbon group with 1–4 carbon atoms and
$R^1$ is—
  (a) alkyl or alkenyl of 2 to 8 carbon atoms, alkoxyalkyl of 4 to 8 carbon atoms, at least two of which carbon atoms forming the alkylene portion,
  (b) phenyl-lower alkyl,
  (c) cyclohexyl-lower alkyl,
  (d) endoalkylene-cyclohexyl, -cyclohexyl, -cyclohexyl-methyl or -cyclohexenyl-methyl of 1–2 endoalkylene carbon atoms each,
  (e) lower alkyl-cyclohexyl, lower alkoxy-cyclohexyl,
  (f) cycloalkyl of 5 to 8 carbon atoms each,
  (g) cyclohexenyl, cyclohexenyl methyl,
  (h) dimethyl-cyclohexyl, and salts thereof.

The present application is a continuation-in-part-application of application Ser. No. 471,449, filed July 12, 1965, now abandoned, and relates to benzenesulfonyl-ureas of the formula and definition set forth in the abstract of the disclosure. These ureas as such or in the form of their physiologically tolerable salts, possess blood sugar lowering properties and are distinguished by a strong lowering of the blood sugar level.

In the above and the following definitions "lower alkyl" and "lower alkoxy" are always intended to mean groups of 1 to 4 carbon atoms in a straight or branched chain. "Lower acyl" stands for an acyl group (organic acid group) having up to 4 carbon atoms, preferably a straight-chain or branched alkanoyl group of the indicated chain length.

$R^1$ may represent, for example, ethyl, propyl, isopropyl, butyl, isobutyl, sec. butyl, straight chain or branched amyl (pentyl), hexyl, heptyl or octyl; the groups with an ethylenic double linkage, such as allyl or crotyl corresponding to the above-mentioned hydrocarbon groups, furthermore alkyls with 2 to 7 carbon atoms, carrying, in addition, a mercapto group, for instance β-mercaptoethyl or higher mercaptoalkyls.

$R^1$ may likewise represent, for instance γ -methoxypropyl, δ-methoxy-n-butyl, β-ethoxy-ethyl, γ-ethoxypropyl, δ-ethoxybutyl or higher alkyloxy-ethyls, alkyloxypropyls or alkyloxybutyls. Furthermore, $R^1$ may stand for benzyl, α-phenylethyl, β-phenylethyl, α-, β- or γ-phenylpropyl or phenylbutyls.

Within the scope of the invention there are particularly preferred compounds containing as $R^1$ a cycloaliphatic hydrocarbon group which may be substituted by alkyl or alkoxy or linked to the nitrogen atom by means of alkylene. Said groups comprise, for instance, cyclopentyl, cyclohexyl, cycloheptyl, cyclooctyl, methylcyclohexyl, ethyl-cyclohexyl, propyl-cyclohexy, isopropyl-cyclohexyl, methoxy - cyclohexyl, ethoxy - cyclohexyl, propoxy-cyclohexyl, isopropoxy-cyclohexyl. The alkyl groups or the alkoxy groups can be present in 2-, 3- or 4-position, in cis- as well as in trans-position. Furthermore, there are mentioned: Cyclohexylmethyl, α- or β-cyclohexylethyl, cyclohexylpropyls, endomethylene - cyclohexyl (2,2,1-tri-cycloheptyl), endoethylene-cyclohexyl (2,2,2 - tricyclooctyl), endomethylene-cyclohexenyl, endoethylene-cyclohexenyl, endomethylene cyclohexylmethyl, endoethylene - cyclohexylmethyl, endomethylene - cyclohexylmethyl, endoethylene-cyclohexylmethyl, endomethylene-cyclohexenylmethyl, endoethylene-cyclohexenylmethyl, or dimethyl-cyclohexyl.

As examples for the bridging member Y there are mentioned: —$CH_2$—, —$CH_2$—$CH_2$—, —$CH(CH_3)$—, $CH_2$—$CH_2$—$CH_2$—, —$CH(CH_3)$—$CH_2$—,

—$CH_2$—$CH(CH_3)$—, —$C(CH_3)_2$—,

—$CH_2$—$CH_2$—$CH_2$—$CH_2$,—

—$CH(CH_3)$—$CH_2$—$CH_2$—,

—$CH_2$—$CH(CH_3)$—$CH_2$—, —$CH_2$—$C(CH_3)_2$—,

—$CH(C_2H_5)$—, —$C(CH_3)$ $(C_2H_5)$—.

Preferably the group Y contains 2 to 3 carbon atoms and represents —$CH_2$—$CH_2$—, —$CH(CH_3)$—$CH_2$— or —$CH_2$—$CH$—$(CH_3)$—. In case a halogen atom stands for the substituent Z, chlorine is preferred.

The present invention furthermore provides a process for the manufacture of the above-specified benzenesulfonyl ureas and of their salts. These benzenesulfonyl-ureas can be prepared according to the following methods:

(a) Benzenesulfonyl isocyanates, benzenesulfonyl carbamic acid esters, benzenesulfonyl thiocarbamic acid esters, benzenesulfonyl carbamic acid halides or benzenesulfonyl-ureas which are substituted by the group

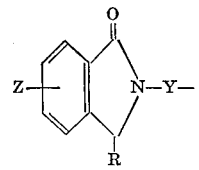

are reacted with R¹-substituted amines or, if desired with their salts.

(b) Benzenesulfonamides of the formula

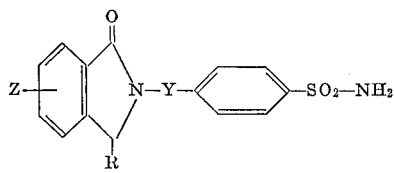

or, desired, their salts, are reacted with R¹-substituted isocyanates, carbamic acid esters, thiocarbamic acid esters, carbamic acid halides or ureas.

(c) Correspondingly substituted benzenesulfonyl halide are reacted with R¹-substituted ureas, isourea ethers, isothiourea ethers or parabanic acids and the benzenesulfonyl-isourea ethers, benzenesulfonyl-isothiourea ethers or benzenesulfonyl-parabanic acids obtained in this or another manner are hydrolyzed.

(d) The sulfur atom in correspondingly substituted benzenesulfonyl-thioureas is replaced by an oxygen atom.

(e) Corresponding benzenesulfinyl-ureas or benzenesulfenyl-ureas are oxidized.

(f) In benzenesulfonyl-ureas of the formulae

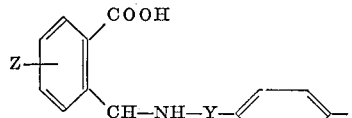

or

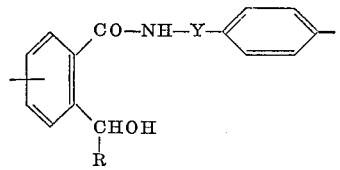

the phthalimidino ring is formed, and this formation can also take place in several stages, if desired via the functional derivatives of the group —COOH— or

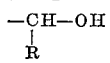

The products obtained according to the afore-mentioned methods can be treated with alkaline agents if salt formation is desired.

According to the nature of the starting substances and the working conditions of the phthalimidino ring can be opened unintentionally if the process is carried out according to methods (a) to (e). In such cases the method in question must be followed by the method described sub (f) in order to close the ring again.

Instead of benzenesulfonyl isocyanates there can also be used the reaction products of benzenesulfonyl isocyanates with acid amides, such as caprolactam or butyrolactam, furthermore, with weakly basic amines, for example carbazoles.

The above-mentioned benzenesulfonyl-carbamic acid esters or benzenesulfonyl-thiocarbamic acid esters can contain a low molecular weight alkyl radical or a phenyl radical in the alcohol component. The same applies to the R¹-substituted carbamic acid esters or the corresponding mono-thiocarbamic acid esters. By low molecular weight or lower alkyl radical there is always to be understood an alkyl radical containing at most 4 carbon atoms.

As carbamic acid halides, the chlorides are particularly suitable.

The benzenesulfonyl-ureas to be used as starting substances in the process of the present invention may be unsubstituted at the side of the urea molecule opposite the sulfonyl group or they may be mono- or di-substituted by preferably lower alkyl or aryl radicals. Instead of benzenesulfonyl-ureas substituted in such manner, there may also be used corresponding N-benzenesulfonyl-N'-acyl-ureas and bis-(benzenesulfonyl)-ureas. Such bis-(benzenesulfonyl)-ureas or N-benzenesulfonyl-N'-acyl-ureas may, for example, be treated with amines R¹—NH₂ and the salts obtained may then be heated to elevated temperatures, in particular to temperatures above 100° C.

Furthermore, it is possible to start from ureas of the formula R¹—NH—CO—NH₂ or from acylated ureas of the formula R¹—NH—CO—NH-acyl, wherein acyl represents a preferably low molecular weight aliphatic or an aromatic acid group or from nitro ureas of the formula R¹—NH—CO—NH—NO₂ or from diphenyl-ureas of the formula R¹—NH—CO—N(C₆H₅)₂, in which the phenyl groups may be substituted and/or linked with one another either directly or through a bridging member such as —CH₂—, —NH—, —O— or —S—, or from N,N-disubstituted ureas of the formula

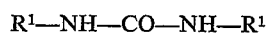

and to react these ureas with benzenesulfonamides substituted by the grouping

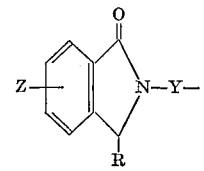

The replacement of the sulfur atom in the correspondingly substituted benzenesulfonyl-thioureas by an oxygen atom can be carried out, for example, with the aid of oxides of salts of heavy metals or even by the use of oxidizing agents such as hydrogen peroxide, sodium peroxide or nitrous acid.

The thioureas can also be desulfurized by a treatment by means of phosgene or phosphorus pentachloride. Chloroformic acid amidines or carbodiimides, obtained as intermediate stage, can be converted into benzenesulfonyl ureas by appropriate measures for example by saponification or addition of water.

The formation of the phthalimidino compound—starting from the compounds of Formula III or IV—can likewise be realized by heating said compound to elevated temperatures.

As regards the reaction conditions, the forms of realizing the process of the present invention may in general vary within wide limits and may be adapted to each individual case. For example, the reactions using solvents may be carried out at room temperature or at an elevated temperature.

As starting substances, there are used compounds which contain a benzene group substituted by the group

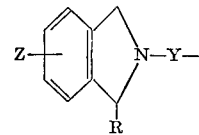

As examples of the component

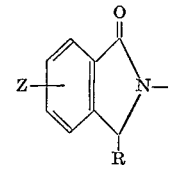

of that formula, there may be mentioned the following groups:

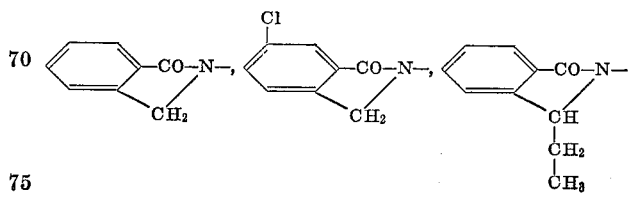

The blood sugar lowering action of the benzenesulfonyl urea derivatives described above was determined by measuring over a prolonged period of time, according to the known method of Hagedorn-Jensen or with an autoanalyzer the blood sugar level of rabbits which had been fed with the compounds in doses of 10 milligrams/kilogram.

Thus, it was found, for example, that 10 milligrams/kilograms of N-[4-(β-phthalimidino - α - methyl-ethyl)-benzenesulfonyl]-N'-cyclohexyl-urea provoked, after 3 hours, a lowering of the blood sugar level by 14%, whereas the known N-(4-methyl-benzenesulfonyl)-N'-butyl-urea, administered to rabbits in a dose of less than 25 milligrams/kilogram provoked no lowering of the blood sugar level.

The strong blood sugar lowering action of the products of the present invention becomes particularly evident when reduced doses are administered. When N[4-(β-phthalimidinoethyl) - benzenesulfonyl] - N'-cyclohexyl-urea is administered to rabbits in a dose of 2 milligrams/kilogram, a distinct lowering of the blood sugar level (—17%) can still be detected.

Values of further compounds of the present invention concerning their pharmacological abilities are listed in the following table.

TABLE

| Compound: | K10 [1] |
|---|---|
| N - [4-(β-phthalimidino-ethyl)-benzenesulfonyl]-N'-cyclohexyl-urea | 17 |
| N - [4-(β-phthalimidino-ethyl)-benzenesulfonyl]-N'-(4-methyl-cyclohexyl)-urea | 21 |
| N - [4-β-phthalimidino-α-methyl-ethyl)-benzenesulfonyl]-N'-n-butyl-urea | 14 |
| N - [4-(β-<5-chloro-phthalimidino>-ethyl)-benzene-sulfonyl]-N'-n-butyl-urea | 30 |
| N - [4-(β-<5-chloro-phthalimidino>-ethyl)-benzene-sulfonyl]-N'-cyclohexyl-urea | 35 |
| N-[4-(β-<5-chloro-phthalimidino> - ethyl - benzene-sulfonyl] - N' - (4 - methyl - cyclohexyl)-urea | 33 |
| N - [4-(β-<3-ethyl-phthalimidino>-ethyl) - benzene-sulfonyl]-N'-cyclohexyl-urea | 15 |
| N - [4-(β-<5-chloro-phthalimidino>-ethyl)-benzene-sulfonyl] - N'-(2,5-endomethylene-Δ³-cyclohexenyl-methyl)-urea | 34 |
| N - [4-(β-<5-chloro-phthalimidino>-ethyl)-benzene - sulfonyl] - N'-(2,5-endomethylene-cyclohexyl-methyl)-urea | 28 |
| N-[4-(β-<5-chloro-phthalimidino>-ethyl) - benzene-sulfonyl] - N'-(4,4-dimethyl-cyclohexyl)-urea | 22 |
| N - [4-(β-phthalimidino-ethyl)-benzenesulfonyl]-N' - (2,5-endomethylene - Δ³ - cyclohexenyl-methyl)-urea | 17 |
| N - [4-(β - phthalimidino - ethyl) - benzenesul- N' - (2,5 - endomethylene-cyclohexyl-methyl)-urea | 25 |
| N - [4-(β<5-chloro-phthalimidino>-ethyl)-benzenesulfonyl]-N'-cyclopentyl-urea | 19 |
| N - [4-(β-<5-chloro-phthalimidino>-ethyl-benzenesulfonyl] - N' - (4-methoxy-cyclohexyl)-urea | 22 |
| N - [4-(β- <5-chloro-phthalimino>-ethyl)-benzenesulfonyl]-N'-benzene-urea | 12 |
| N - [4-(β-<5-chloro-phthalimidino>-ethyl-benzenesulfonyl]-N'-cyclooctyl-urea | 27 |
| N-[4-(β-<5-chloro-phthalimidino>-ethyl) - benzenesulfonyl]-N'-cyclohexyl-methyl-urea | 31 |
| N - [4-(β-phthalimidino-ethyl-benzenesulfonyl]-N'-Δ³-cyclohexenyl-urea | 28 |

[1] K10 represents the blood sugar lowering effects in percent three hours after having orally administered to rabbits 10 milligrams per kilogram of the listed compounds.

The toxicity of the products of the invention is very low and lies in the range of that of the above mentioned N-(4-methyl-benzenesulfonyl)-N'-n-butyl-urea.

The products of the present invention are intended to be used preferably for the manufacture of orally administrable preparations that have blood sugar lowering action in the treatment of diabetes mellitus; they can be applied as such or in the form of their physiologically tolerable salts or in the presence of substances that causes salt formation. For such salt formation, there can be used, for example, alkaline agents such as alkali metal hydroxides, alkaline earth metal hydroxides alkali metal carbonates and alkaline earth metal carbonates, alkali metal bicarbonates and alkaline earth metal bicarbonates.

As pharmaceutical preparations there enter into consideration preferably tablets which contain, in addition to the products of the invention, the usual adjuvants and carriers such as talc, starch, lactose, tragacanth or magnesium stearate.

A preparation containing the above-mentioned benzenesulfonyl ureas as the active substance for example, a tablet or a powder, with or without the above-mentioned additives, is suitably processed into a suitable dosage unit form. The dose chosen should comply with the efficacy of the benzenesulfonyl-urea used and with the desired effect. Advantageously, the dosage per unit is in the range of from about 0.5 to 100 mg., preferably 2 to 10 mg. However, considerably higher or lower dosage units may also be used which, if desired, may be divided or multiplied prior to their application.

The following examples illustrate the invention, but they are not intended to limit it thereto:

Example 1.—N-[4-(β-phthalimidino-ethyl)-benzenesulfonyl]-N'-cyclohexylurea (a) 53.6 grams of phthalide are dissolved in 500 cc. of xylene, 88.8 grams of 4-(β-aminoethyl)-benzenesulfonamide sodium are added while stirring. The mixture is heated for 30 minutes at the boil, and 24 grams of glacial acetic acid are added dropwise. From this mixture the xylene is removed by distillation. The residue obtained is dissolved in 1 N-sodium hydroxide solution, the solution is clarified with charcoal and acidified after filtration. A precipitate of 4-(β-o-hydroxymethyl-benzamido-ethyl)-benzenesulfonamide is obtained in a good yield, said precipitate is filtered with suction, washed with water and dried. The substance melts at 163–165° C.

(b) By heating the reaction mixture for 90 minutes at about 200° C., cooling and recrystallizing it from methanol, 4-(β-phthalimidino-ethyl)-benzenesulfonamide melting at 251–253° C. is obtained in a good yield from the substance prepared according to the method described sub (a).

(c) 15 grams of the sulfonamide obtained according to (b) are suspended in 250 cc. of acetone. The suspension is stirred, 13 grams of dry, ground potassium carbonate are added, and the whole is heated at the boil for 1 hour. On continuing stirring and heating, 6.3 grams of cyclohexyl isocyanate are added dropwise. After boiling for 6 hours the reaction is terminated, the solvent is distilled under reduced pressure, the residue is taken up in water, filtered after treatment with charcoal and acidified. A precipitate of N-[4-(β-phthalimidino-ethyl)-benzenesulfonyl]-N'-cyclohexyl-urea is obtained in a good yield. The substance melts at 213–215° C. after recrystallization from methanol.

In an analogous manner there are obtained:

the N-[4-(β-phthalimidino-ethyl)-benzenesulfonyl]-N'-(4-methyl-cyclohexyl)urea, melting point 208–210° C. and
the N-[4-(β-phthalimidino-ethyl)-benzenesulfonyl]-N'-Δ³-cyclohexenyl-urea, melting point 174–170° C.

Example 2.—N-[4-(β-phthalimidino-α-methyl-ethyl)-benzenesulfonyl]-N'-cyclohexylurea (a) 20 grams of 4-(β-phthalimido-α-methyl-ethyl)-benzenesulfonamide, obtained from phthalic acid anhydride and 4-(α-methyl-β-aminoethyl)-benzene-4-sulfonamide, are dissolved in 280 cc. of ethanol, 210 cc. of concentrated hydrochloric acid and 42 grams of granulated tin are added. After heating the mixture at the boil for 3 hours, it is diluted with water. The precipitate of β-(phthalimidino-α-methyl-ethyl)-benzene-sulfonamide formed is filtered with suction, the substance is washed with water and dried. Melting point 244–247° C.

(b) 11 grams of the sulfonamide obtained according to (a) are suspended in 250 cc. of acetone. 8.7 grams of potassium carbonate are added, and the whole is heated at the boil under reflux for 1 hour. After addition of 4 grams of cyclohexyl-isocyanate the mixture is kept for 5 and a half hours at the boiling temperature while stirring simultaneously. The acetone is then distilled, and the residue is dissolved in water. The solution is clarified with charcoal, and the filtrate is acidified. A crystalline precipitate of N-[4-(β-phthalimidino-α-methyl-ethyl)-benzenesulfonyl]-N′-cyclohexyl-urea is obtained in a good yield. It is filtered with suction and recrystallized from methanol. The substance melts at 198–200° C.

In analogous manner there is obtained from 4-(β-phthalimidino-α-methyl-ethyl)-benzenesulfonamide and butyl-isocyanate, N-[4-(β-phthalimidino-α-methyl-ethyl)-benzenesulfonyl]-N′-butyl-urea which melts at 166–168° C. (from methanol).

Example 3.—N-[4-(β-phthalimidino-ethyl)-benzenesulfonyl]-N′-cyclohexyl-urea (a) 27 grams of phthalidae are dissolved in 200 cc. of xylene. 44.4 grams of 4-(β-aminoethyl)-benzenesulfonamide sodium are added while stirring. The solution is heated at the boil for 30 minutes, 12 grams of glacial acetic acid are added dropwise and stirring is continued for a further 90 minutes at the boiling temperature. The residue, obtained after having removed the solvent under reduced pressure, is dissolved in 1 N-sodium hydroxide solution. It is filtered with the use of charcoal, and the filtrate is acidified. A crystalline precipitate of 4-(β-o-hydroxymethyl-benzamido-ethyl)-benzenesulfonamide is obtained which is filtered with suction, washed with water and dried. The substance melts at 161–163° C.

(b) 6.7 grams of the sulfonamide obtained according to (a) are dissolved in 10 cc. of 2 N-sodium hydroxide solution. After addition of 50 cc. of acetone, the solution is cooled to about 0° C., and 2.5 grams of cyclohexyl-isocyanate are added while stirring. The mixture is then stirred for 2 hours at room temperature and diluted with water. It is filtered, and the filtrate is acidified. A crystalline precipitate is obtained which is filtered with suction, washed with water and recrystallized from methanol/dimethyl-formamide. The N-[4-(β-phthalimidino-ethyl)-benzenesulfonyl]-N′-cyclohexyl-urea thus obtained melts at 213–215° C. and shows no depression of the melting point with the substance obtained according to Example 1.

Example 4.—N-[4-(β-phthalimidino-ethyl)-benzenesulfonyl]-N′-cyclohexyl-urea (a) 4.57 grams of N-[4-(β-phthalimidino-ethyl)-benzenesulfonyl]-N′-cyclohexyl-thiourea are dissolved in 250 cc. of methanol. A suspension of 2.2 grams of mercury oxide in 50 cc. of methanol is added while stirring, and the whole is heated for 3 and a half hours at about 60° C. while continuing stirring. After cooling, the solution is filtered and concentrated. The concentrated methanolic solution obtained is carefully mixed with water, and a crystalline precipitate of N-[4-(β-phthalimidino-ethyl)-benzenesulfonyl]-N′-cyclohexyl-isourea methyl ether is obtained. The substance melts at 139–141° C. after recrystallization from methanol.

(b) 0.4 gram of the isourea methyl ether obtained according to (a) are heated for 5 minutes on the steam bath with 10 cc. of concentrated hydrochloric acid. The mass is then cooled, the crystals obtained are filtered with suction and washed with water. After recrystallization from methanol, the N-[4-(β-phthalimidino-ethyl)-benzenesulfonyl]-N′-cyclohexyl urea is obtained in a good yield. The substance melts at 213–215° C.

Example 5.—N-[4-(β-phthalimidino-ethyl)-benzenesulfonyl]-N′-cyclohexyl-urea 4.2 grams of N-[4-(β-phthalimidino-ethyl)-benzenesulfonyl]-carbamic acid methyl ester (obtained by reacting 4-(β-phthalimidino-ethyl)-benzenesulfonamide and chloroformic acid methyl ester in acetone in the presence of potassium carbonate, melting point 228–231° C.) are suspended in 150 cc. of dioxane. After addition of 1.1 grams of cyclohexyl amine, the suspension is heated at the boil under reflux for 90 minutes. The solvent is then removed under reduced pressure, and the residue obtained is recrystallized from methanol. In order to purify the reaction product it is taken up in dilute aqueous ammonia and filtered, and the filtrate is acidified. The precipitate of N-[4 - (β-phthalimidino-ethyl) - benzenesulfonyl] - N′-cyclohexyl-urea thus obtained melts at 213–215° C. after recrystallization from methanol.

In an analogous manner there are obtained:

the N-[4-(β-phthalimidino-ethyl) - benzenesulfonyl]-N′-(2,5 - endomethylene-Δ³-cyclohexenyl - methyl)-urea, melting point 196–198° C. and the N-[4-(β-phthalimidino-ethyl) - benzenesulfonyl]-N′-(2,5 - endomethylene-cyclohexyl-methyl)-urea, melting point 203–205° C.; from the N-[4-(β-<5-chloro-phthalimidino>-ethyl)-benzenesulfonyl]-carbamic acid methyl ester, melting point 202–204° C., the N-(4-(β-<5-chloro-phthalimidino>-ethyl)-benzenesulfonyl]-N′-(2,5-endomethylene-Δ³-cyclohexyl-methyl)-urea, melting point 148–150° C., the N-(4-(β-<5-chloro-phthalimidino>-ethyl)-benzenesulfonyl]-N′-(2,5-endomethylene-cyclohexyl-methyl)-urea, melting point 171–173° C., the N-(4-(β-<5-chloro-phthalimidino>-ethyl)-benzenesulfonyl]-N′-allyl-urea, melting point 172–184° C., the N-(4-(β-<5-chloro-phthalimidino>-ethyl)-benzenesulfonyl]-N‛-cyclopentyl-urea, melting point 183–185° C., the N-(4-(β-<5-chloro-phthalimidino>-ethyl)-benzenesulfonyl]-N′-(4-methoxy-cyclohexyl)urea, melting point 103–105° C., the N-(4-(β-<5-chloro-phthalimidino>-ethyl)-benzenesulfonyl]-N′-benzyl-urea, melting point 210–212° C., the N-(4-(β-<5-chloro-phthalimidino>-ethyl)-benzenesulfonyl]-N′-(γ-methoxy-propyl)-urea, melting point 152–154° C., the N-(4-(β-<5-chloro-phthalimidino>-ethyl)-benzenesulfonyl]-N′-cyclooctyl-urea, melting point 165–167° C. and the N-(4-(β-<5-chloro-phthalimidino>-ethyl)-benzenesulfonyl]-N′-cyclohexyl-methyl-urea, metling point 180–182° C.

Example 6.—N-[4-(β-phthalimidino-ethyl)-benzenesulfonyl]-N′-cyclohexyl-urea (a) 21.6 grams of 4-(β-phthalimidino-ethyl)-benzensulfonamide are dissolved in 200 cc. of ethanol. A solution of 11.4 grams of potassium cyanate in 15 cc. of water is added while shaking. The solution is heated at the boil under reflux on the steam bath, and the solvent alcohol is then distilled to a large extent. The residue obtained is dissolved in water. The solution is filtered and acidified. The precipitate, thus obtained, is taken up in dilute ammonia of about 1% strength. After acidification there is obtained a crystalline mass of N-[4-(β-phthalimidino-ethyl)-benzenesulfonyl] - urea. The substance melts at 220–222° C. after recrystallization from a mixture of methanol/dimethyl-formamide with decomposition.

(b) 3.6 grams of the urea obtained according to (a) are suspended in 100 cc. of toluene. After addition of 0.66 gram of glacial acetic acid and 1.1 gram of cyclohexylamine the suspension is heated at the boil under reflux on the oil bath for 3 and a half hours. The reaction mixture is cooled and allowed to stand over night. On the next morning the crystallized precipitate is filtered with suction, washed with diisopropyl ether and water and recrystallized from a mixture of methanol/dimethylformamide. The N-[4 - (β-phthalimidino-ethyl) - benzenesulfonyl]-N'-cyclohexyl-urea obtained in a good yield melts at 213–215° C.

Example 7.—N-[4-(β-5-chlorophthalimidino-ethyl)-benzenesulfonyl]-N'-cyclohexyl-urea 11.7 grams of 4-(β-5-chlorophthalimidino-ethyl)benzenesulfonamide (prepared by reduction of the corresponding phthalimide derivative, melting point 176–178° C.) and 9.2 grams of potassium carbonate are heated at the boil in 1500 cc. of acetone for 1 hour while stirring. 4.2 grams of cyclohexyl-isocyanate are then added dropwise, and stirring and heating is continued for 4 hours. After concentration under reduced pressure, the residue obtained is mixed with dilute hydrochloric acid and the crystalline mass formed is filtered with suction. The substrate is dissolved in ammonia of about 1% strength, the filtrate is acidified with dilute hydrochloric acid. The N-[4 - (β-5-chloro-phthalimidino-ethyl) - benzenesulfonyl]-N'-cyclohexyl-urea is obtained in a good yield. The substance melts at 151–153° C. after recrystallization from isopropanol.

In analogous manner there is obtained from the same benzenesulfonamide and 4-methyl-cyclohexyl-isocyanate, the N - [4-(β-5-chlorophthalimidino-ethyl) - benzenesulfonyl]-N'-(4-methyl-cyclohexyl)-urea melting at 134–136° C. after recrystallization from methanol, and with the use of n-butyl-isocyanate, the N-[4-(β-5-chlorophthalimidino-ethyl)-benzenesulfonyl]-N'-butyl-urea. The substance melts at 150–162° C. after recrystallization from isopropanol, and with the use of 4,4-dimethyl-cyclohexyl-isocyanate, the N-[4-(β-5-chloronaphthalimidino-ethyl)-benzenesulfonyl]-N'-(4,4-dimethylcyclohexyl)-urea, melting point 201–203° C. after recrystallization from isopropanol.

Example 8.—N-[4-(phthalimidino-methyl)-benzenesulfonyl]-N'-cyclohexyl-urea 15 grams of 4-(phthalimidino-methyl)-benezenesulfonamide (obtained from phthalimidino-methyl-benzene by chlorosulfonation and reaction of the sulfonic acid chloride, obtained as intermediate product, with ammonia, melting point 228–230° C., or from 4-phthalimidino-methyl-benzenesulfonamide by reduction with granulated tin and concentrated hydrochloric acid in ethanol) are boiled under reflux in 250 cc. of acetone in the presence of 13.8 grams of potassium carbonate while stirring simultaneously. 6.3 grams of cyclohexyl-isocyanate are then added dropwise at the boiling temperature of the acetone and stirring and boiling is continued for a further 6 hours. After standing over night, the reaction mixture is filtered with suction, and the salt mixture obtained is dissolved in water. The solution is filtered.

After acidification, the crystalline precipitate of N-[4-(phthalimidino-methyl)-benzenesulfonyl]-N' - cyclohexyl urea is obtained in a good yield. It melts at 203–205° C. after recrystallization from methanol.

In analogous manner there is obtained from 4-(phthalimidino-methyl)-benzenesulfonamide and 4-methyl-cyclohexylisocyanate, the N-[4-(phthalimidino-methyl) - benzenesulfonyl]-N'-(4-methyl-cyclohexyl)-urea melting at 191–193° C. (from methanol).

Example 9.—N-[4-(β-3-ethyl-phthalimidino-ethyl)-benzenesulfonyl]-N'-cyclohexyl-urea 7.6 grams of 4-(β-3-ethyl-phthalimidino-ethyl)-benzenesulfonamide (melting point 215–217° C.) prepared from 2-β-phenylethyl-3-ethyl-phthalimidine by sulfochlorination and reaction with ammonia) and 6.2 grams of potassium carbonate are added to 100 cc. of acetone. The mixture is heated at the boil under reflux for 1 hour while stirring. 2.8 grams of cyclohexyl-isocyanate are then added dropwise, and stirring is continued for a further 3 hours at the boiling temperature. The reaction product is dissolved in water, the solution is filtered and the filtrate is acidified with dilute hydrochloric acid. The crystalline precipitate thus obtained is filtered with suction and dissolved in ammonia of 1% strength. Upon acidification with acetic acid the N - [4-(β-3-ethyl-phthalimidino-ethyl)-benzenesulfonyl]-N'-cyclohexyl urea is obtained in a good yield. It melts at 105–107° C.

We claim:
1. A compound of the formula

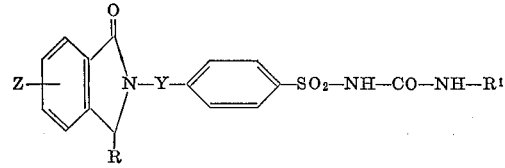

in which:

R is hydrogen or lower alkyl,
Z is hydrogen or halogen,
Y is a saturated hydrocarbon group with 1–4 carbon atoms and
$R^1$ is—
  (a) alkyl or alkenyl of 2 to 8 carbon atoms, alkoxyalkyl of 4–8 carbon atoms at least two of which carbon atoms forming the alkylene portion,
  (b) phenyl-lower alkyl,
  (c) cyclohexyl-lower alkyl,
  (d) endoalkylene-cyclohexyl, -cyclohexenyl, -cyclohexyl-methyl or -cyclohexenyl-methyl of 1–2 endoalkylene carbon atoms each,
  (e) lower alkyl-cyclohexyl, lower alkoxy-cyclohexyl,
  (f) cycloalkyl of 5–8 carbon atoms each,
  (g) cyclohexenyl, cyclohexenyl methyl, or
  (h) dimethyl-cyclohexyl, and physiologically tolerable salts thereof.

2. A benzenesulfonyl-urea as claimed in claim 1 wherein Y is —$CH_2$—$CH_2$—.
3. A benzenesulfonyl-urea as claimed in claim 1 wherein R is hydrogen.
4. A benzenesulfonyl-urea as claimed in claim 1 wherein Z is chlorine in 5-position.
5. A benzenesulfonyl-urea as claimed in claim 1 wherein $R^1$ is cyclohexyl.
6. A benzenesulfonyl-urea as claimed in claim 1 wherein $R^1$ is 4-methyl-cyclohexyl.
7. A benzenesulfonyl-urea as claimed in claim 1 wherein $R^1$ is 2,5-endomethylene-$\Delta^3$-cyclohexenyl-methyl.
8. A benzenesulfonyl-urea as claimed in claim 1 wherein $R^1$ is 2,5-endomethylene-cyclohexyl-methyl.
9. A benzenesulfonyl-urea as claimed in claim 1 wherein $R^1$ is 4,4-dimethyl-cyclohexyl.
10. A benzenesulfonyl-urea as claimed in claim 1 wherein $R^1$ is 4-methoxy-cyclohexyl.
11. A benzenesulfonyl-urea as claimed in claim 1 wherein $R^1$ is cyclohexyl-methyl.
12. A benzenesulfonyl-urea as claimed in claim 1 wherein $R^1$ is $\Delta^3$-cyclohexenyl.
13. N-[4-(β-phthalimidino - ethyl) - benzenesulfonyl]-N'-cyclohexyl-urea or a physiologically tolerable salt thereof.

14. N-[4-(β-phthalimidino - ethyl) - benzenesulfonyl]-N'-(4-methyl-cyclohexyl)-urea or a physiologically tolerable salt thereof.

15. N-[4-(β-<5-chloro-phthalimidino> - ethyl) - benzenesulfonyl]-N'-cyclohexyl-urea or a physiologically tolerable salt thereof.

16. N-[4-(β-<5-chloro-phthalimidino> - ethyl) - benzenesulfonyl]-N'-(4-methyl-cyclohexyl)-urea or a physiologically tolerable salt thereof.

References Cited

Hokfelt et al.: Jour. Med. Pharm. Chem., vol. 5, pp. 231–9 (1962).

ALEX MAZEL, Primary Examiner

J. A. NARCAVAGE, Assistant Examiner

U.S. Cl. X.R.

424—274